UNITED STATES PATENT OFFICE.

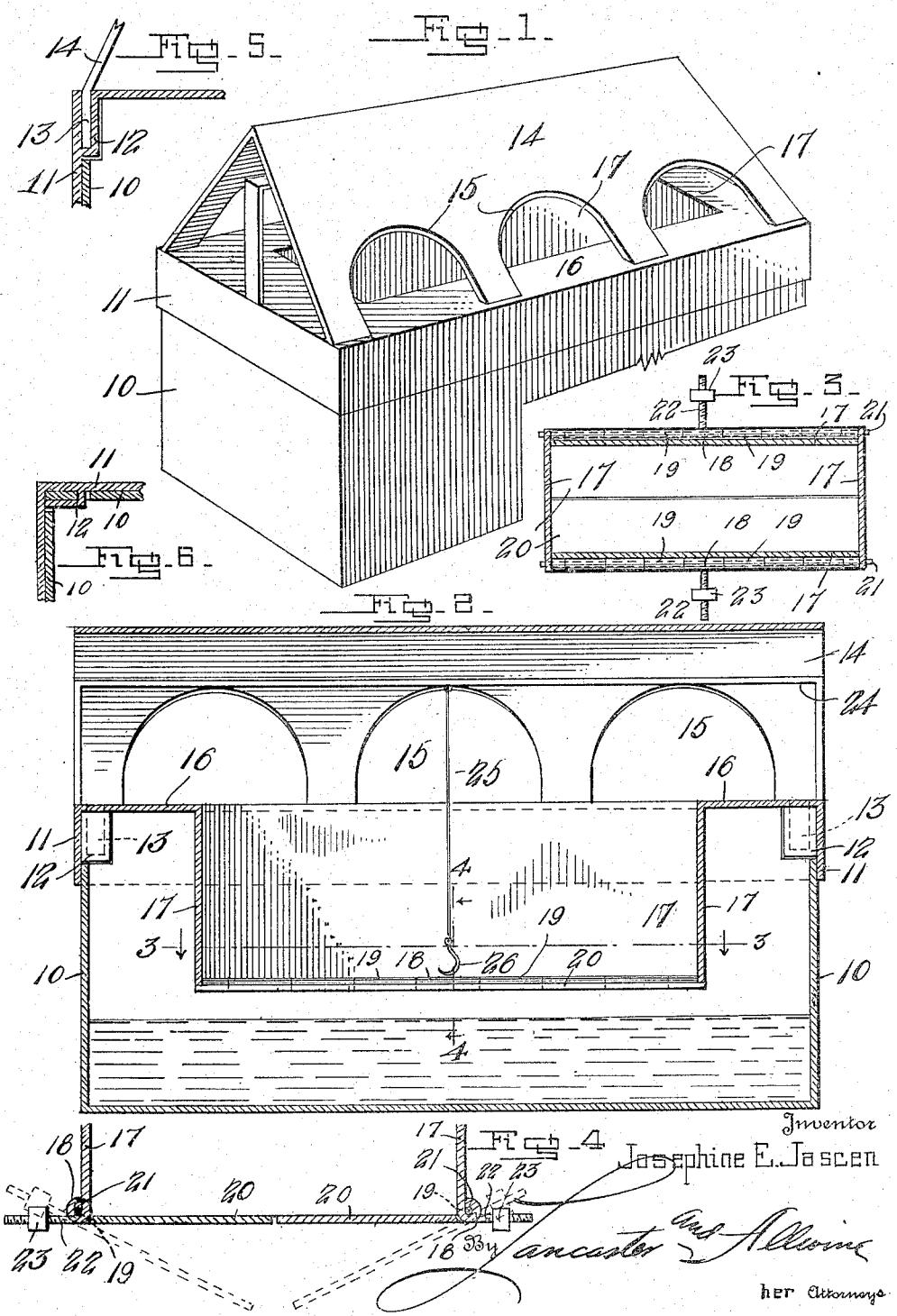

JOSEPHINE E. JASCEN, OF OCEANSIDE, CALIFORNIA.

MOUSE AND RAT TRAP.

1,228,324.

Specification of Letters Patent. Patented May 29, 1917.

Application filed January 4, 1917. Serial No. 140,611.

*To all whom it may concern:*

Be it known that I, JOSEPHINE E. JASCEN, a citizen of the United States, and a resident of Oceanside, in the county of San Diego and State of California, have invented a certain new and useful Improvement in Mouse and Rat Traps, of which the following is a specification.

The present invention relates to animal traps, and has more particular reference to that type of trap used for catching mice and rats.

The present invention has for an object to provide a trap wherein the dead animals do not have to be handled in removing the same from the trap, and wherein a disinfectant may be used.

Another object of the present invention is to provide a trap which is automatically sprung by the weight of the animal, and which does not depend upon the pulling action of the mouse or rat on the bait to spring the trap, to provide a trap which has one or more yieldingly closed doors, and a trap which accommodates a relatively large number of these animals.

The present invention still further aims at the provision of a trap which has means for protecting the bait from larger animals, such as cats and dogs; and a trap which has no springs, few parts of simple construction, and which may be readily assembled and separated.

The above, and other objects and advantages of this invention will be more particularly brought out in the following detailed description of the present preferred embodiment, the same being illustrated in the accompanying drawings wherein:

Figure 1 is a perspective view partly broken away, of a trap constructed according to the present invention.

Fig. 2 is an enlarged vertical section taken longitudinally through the trap.

Fig. 3 is a horizontal sectional view taken on the line 3—3 of Fig. 2, showing the animal receiving well and the doors in closed position at the lower end of the well.

Fig. 4 is an enlarged fragmentary sectional view taken transversely through the lower end of the well, showing the doors closed in full lines, the dotted lines showing the doors partially open.

Fig. 5 is a detail fragmentary view in section, of the upper end of the frame, showing the socket arranged in one corner thereof and the cover post fitting in the socket.

Fig. 6 is a horizontal sectional view of the same.

Referring to this drawing, 10 designates a receptacle adapted to contain a quantity of water, and being shown in the present instance as of rectangular form. The receptacle 10 is open at its top and is adapted to receive thereover a frame 11 which conforms to the shape of the receptacle 10 and is provided in its corners with supporting blocks 12. The blocks 12 engage the upper edge of the receptacle 10 and hold the frame 11 about the upper end thereof. The blocks 12 are provided with sockets or openings therein which extend through the top of the blocks and are adapted to receive downwardly therethrough posts 13 which depend from the opposite ends and sides of a cover or roof 14. The roof 14 is substantially V-shaped in cross section and is adapted to slope downwardly at the opposite sides of the trap. The opposite sides of the roof 14 are cut away or arched to provide a plurality of lateral openings 15 of sufficient size to permit the passage of mice and rats therethrough. The roof 14 is open at its opposite ends, and is adapted to rest at its lateral edges upon the upper edge of a platform 16 which extends inwardly from the top of the frame 11.

A well 17 is formed at the inner marginal edge of the platform 16, and comprises substantially a depending flange forming a rectangular receptacle corresponding in shape to the container or receptacle 10. This well 17 extends downwardly into the receptacle 10 a considerable distance, and terminates above the bottom thereof. The lower lateral edges of the flange 17 are provided with depending tongues 18 which are preferably rolled outwardly, as shown to advantage in Fig. 4, and are arranged in spaced-apart relation throughout the length of the lateral edges of the flange 17 to receive therebetween the rolled over tongues 19 formed upon the inner edges of a pair of opposed doors 20. A pintle 21 passes through the tongues 18 and 19 to hingedly connect the adjacent door 20 to the lower edge of the flange 17. The doors 20 are of slightly greater length than the length of the adjacent lateral edges of the flange 17 and are adapted to engage against the lower edges of the end walls of the well 17 when the doors are in closed position. This structure limits the upward swinging of the doors 20 and holds the same in closed position as shown in full lines in Fig. 4.

The inner hinged edges of the doors 20 are provided with projecting threaded stems 22 which extend outwardly beyond the walls of the well 17, and which receive thereon weights 23, the latter being threaded upon the stems 22 and adapted for adjustment toward and from the hinge to overbalance the doors 20 and normally hold them in closed position.

The frame 11 is provided with an upwardly arched bail 24 which is secured at its opposite ends to the ends of the frame 11. The bail 24 carries at its intermediate portion a depending wire 25, or other suitable support, upon which is suspended a bait-receiving hook 26. The support 25 is of such length that the bait hook 26 is held immediately above the doors 20 to support the bait, placed on the hook 26, on top of the doors 20, and to prevent the falling of the bait therethrough when the doors are opened.

In operation, the animal enters the trap through the ends of the cover 14, or through the openings 15 in the sides thereof. The animal passes inwardly over the platform 16 and jumps into the well 17 to catch the bait on the hook 26. The weight of the animal is thrown on the doors 20, and overbalances the weight 23 swinging the doors 20 into an open position, as shown in dotted lines in Fig. 4. This opening of the doors 20 permits the animal to fall through into the bottom of the receptacle 10, and into the body of water contained therein. The doors 20 immediately close, and the trap is ready to receive another animal. It is readily seen that the trap is capable of accommodating a large number of animals, depending upon the size of the receptacle 10, and that the animals caught in the trap are not in view and cannot frighten away other animals entering the trap.

In order to remove the animals from the receptacle 10, it is only necessary to lift the frame 11 from the top of the receptacle, and to pour the contents of the receptacle with the animals out into any desired receptacle or place of discharge. If desired, the water in the receptacle may be mixed with a disinfectant or the like to render the trap sanitary, and to also offset the odor incident to the dead animals therein.

The entire trap may be made from tin or like sheet metal, is strong, may be economically manufactured, and may be readily assembled and separated. The cover 14 may be disengaged from the frame 11 by merely lifting the posts 13 out of the sockets in the blocks 12. The cover 14 is used mainly for the purpose of protecting the bait on the hook 26 from cats, dogs and other large animals.

It is of course understood that various changes and modifications may be made in the details of construction of the above-specifically described trap without departing from the spirit of this invention, and being restricted only by the scope of the following claims.

I claim:

1. In a trap, the combination of an open-ended receptacle adapted to contain a quantity of water, a frame adapted to fit over the open end of said receptacle and provided with an inwardly extending platform at its upper edge, a well depending from the inner marginal edge of said platform and adapted to overhang the body of water, a pair of doors hinged in the lower end of the well, means for normally maintaining the doors closed, a bail arched upwardly from said frame and bridging said well, a bait support depending from the intermediate portion of said bail and including a hook arranged above said doors when closed, and a detachable cover fitting over said frame and over said well and provided in its sides and ends with openings adapted to receive small animals.

2. In a trap, the combination of a receptacle open at its upper end and adapted to contain a body of water, a frame fitting over the upper end of said receptacle and provided in its opposite corners with socketed blocks adapted to rest upon the upper edge of the receptacle to support the frame, a well carried by said frame and adapted to extend downwardly into the receptacle, yieldingly closed doors carried in the well, a bait support on the frame for supporting bait in the well above said doors, and a cover extending over the well and provided with depending posts at its opposite corners adapted to fit into said sockets of the frame.

3. In a trap, the combination of a receptacle adapted to contain a quantity of water, a well depending into the receptacle, a closure for the lower end of the well, means for normally maintaining the closure shut, a bait support depending into the well, and a cover fitting over said receptacle and said well for housing the same and provided with openings therethrough adapted to receive small animals.

4. In a trap, the combination of a receptacle open at its upper end and adapted to contain a body of water, a frame fitting about the upper end of the receptacle and provided with supporting blocks in the corners thereof, an inwardly extending platform carried upon the upper edge of the frame, a well depending from the inner marginal edge of said platform, a pair of opposed hinged doors carried upon the lower end of the well, weights connected to the doors for normally holding the same in closed position, an upwardly arched bail carried by the frame and overhanging the well, a flexible bait support depending from the bail into the well and adapted to support bait above said doors when closed, and a substantially V-shaped cover resting at its lateral edges upon said platform, and provided with depending posts adapted to fit into said frame to support the cover, said cover being provided with open ends and with lateral openings adapted to receive small animals therethrough.

JOSEPHINE E. JASCEN.